(12) United States Patent
Zeman

(10) Patent No.: US 7,533,576 B2
(45) Date of Patent: May 19, 2009

(54) SET FOR MEASURING THE LINEAR STRAIN IN MATERIALS

(75) Inventor: Jindrich Zeman, Zitná 172, Dobrejovice (CZ) 251 70

(73) Assignee: Jindrich Zeman, Dobrejovice (CZ)

( * ) Notice: Subject to any disclaimer, the term of this patent is extended or adjusted under 35 U.S.C. 154(b) by 221 days.

(21) Appl. No.: 10/566,381

(22) PCT Filed: Jul. 29, 2004

(86) PCT No.: PCT/CZ2004/000043

§ 371 (c)(1),
(2), (4) Date: Sep. 18, 2006

(87) PCT Pub. No.: WO2005/010460

PCT Pub. Date: Feb. 3, 2005

(65) Prior Publication Data

US 2007/0056382 A1    Mar. 15, 2007

(30) Foreign Application Priority Data

Jul. 31, 2003   (CZ) .......................... PV 2003-2084

(51) Int. Cl.
G01N 3/00   (2006.01)
(52) U.S. Cl. ...................................... 73/788
(58) Field of Classification Search .............. 73/788, 73/794, 784, 843
See application file for complete search history.

(56) References Cited

U.S. PATENT DOCUMENTS

| | | | |
|---|---|---|---|
| 3,894,428 A | 7/1975 | Boddicker et al. | |
| 4,091,661 A | 5/1978 | Handy et al. | |
| 4,411,160 A | 10/1983 | Lutenegger et al. | |
| 4,524,620 A * | 6/1985 | Wright et al. | 73/587 |
| 4,524,626 A * | 6/1985 | Pabst et al. | 73/784 |
| 7,010,987 B2 * | 3/2006 | Antonelli et al. | 73/799 |

FOREIGN PATENT DOCUMENTS

GB      2253707 A       9/1992

* cited by examiner

Primary Examiner—Harshad Patel
Assistant Examiner—Octavia Davis
(74) Attorney, Agent, or Firm—Buchanan Ingersoll & Rooney PC

(57) ABSTRACT

The invention involves a set for measuring the linear strain of materials, comprising at least two measuring elements fitted with measuring blades with parallel axes of the measuring blades, attachable to the measured material, and a portable reading device with an impression surface made of a material with dimensional stability and strength lower than the strength of the material of the measuring elements and/or the portable measuring device. The measuring blades are fitted with fixtures in the center and the measuring elements are fitted with necks and a tapered end at the bottom; the measuring elements are attached to the surface of the measured material using a resin-based adhesive. The measuring elements are kept in a transport preparation, comprising a plotting board with holes for the measuring elements, following the precision setting of parallelism of the axes of the measuring blades; the joint between the measuring elements and the transport preparation has a lower strength than the joint between the measuring elements and the measured material.

8 Claims, 2 Drawing Sheets

SET FOR MEASURING THE LINEAR STRAIN IN MATERIALS

TECHNICAL FIELD

The invention involves a set for measuring the linear strain of materials, comprising at least two measuring elements fitted with measuring blades with parallel measuring-blade axes, attachable to the measured material, and a portable reading device with an impression surface made of a material with dimensional stability and strength lower than the strength of the material of the measuring elements and/or the portable measuring device.

BACKGROUND ART

The linear strain of materials, particularly metal, is measured in practice using mechanical or optical extensometers, which measure the elongation of the material between two fixed points on a structure. The measuring points are usually guide marks or dents. These extensometers can also be used to measure the linear strain of non-metal materials, for example, fractures in concrete structures and the like in buildings. Because of their limited accuracy, these extensometers require that the measuring points be located on the material or the structure far from each other. These distances are in the hundreds of millimeters.

Higher accuracy of measurement of the distance between reference points, i.e. the possibility to place the points close to each other, can be achieved by using measuring microscopes. Their principal disadvantages are their rather large dimensions and weight, so in practice they cannot be used to measure the strain of materials of existing metal structures, e.g. bridges, large-diameter pipes and the like, especially if the tested pipes are located in constrained conditions, e.g. in nuclear plants. Another big problem is the reduced accessibility of the tested locations for example in isolated oil pipelines, distribution pipes inside other structures, on bridges and the like. Another disadvantage of measuring microscopes is their proneness to damage and reduction of accuracy.

We also know various types of tension meters, such as mechanical, optical, electrical, acoustic, pneumatic, etc. The disadvantages of mechanical, optical, acoustic and pneumatic tension meters are similar to those of the above-mentioned microscopes. Electrical tension meters eliminate some of the above drawbacks, but their principal disadvantage is that they are only able to work within the range of certain temperature values. In case of higher or lower temperatures it is necessary to specially adapt the electrical tension meters, increasing their acquisition price many times.

Another weakness of tension meters, especially electrical, is their limited lifetime, which is reduced proportionately to the climatic conditions under which the measurements are made.

The existing solutions therefore do not basically allow carrying out field measurements to obtain results which would be comparable to the results of measurements under laboratory conditions.

SUMMARY OF THE INVENTION

The above weaknesses are to a large extent eliminated by a set for measuring the linear strain of materials, comprising at least two measuring elements fitted with measuring blades with parallel measuring-blade axes, attachable to the measured material, and a portable reading device with the impression surface made of a material with dimensional stability and strength lower than the strength of the material of the measuring elements and/or the portable measuring device, based on this invention, featuring measuring blades, fitted with fixtures in the center. The bottom section of the measuring elements is fitted with necks and a tapered end. The measuring elements are attached to the surface of the measured material with a resin-based adhesive.

Following the precision setting of parallelism of the measuring-blade axes, the measuring elements are beneficially kept in a transport preparation comprising a plotting board with holes for the measuring elements; the joint between the measuring elements and the transport preparation has a lower strength than the joint between the measuring elements and the measured material. The measuring elements are beneficially placed on the measured material in a rosette-shaped form. An adaptor for guiding the reading device, to the measuring elements can be installed at the measuring elements near the measured material.

The transport preparation beneficially comprises a plotting board, the ends of which are bent upward or which is bail-shaped, fitted with surfaces for keeping the measuring elements at the ends; the portable reading device comprises a similar bail with the impression surface placed at its ends. A device for the remote transfer of the measured data can be attached to the reading device.

Since the measuring elements are fitted with measuring blades, the axes of which are parallel, it is possible to measure their accurate distance and the curvature of the measured material, if any. Thanks to the fixed attachment to the surface of the measured material, it is possible to place the separate measuring elements on different structures to which other measuring devices, cannot be normally connected; these include aircraft structures, surfaces of power facilities and the like. The material of the impression surface of the reading device makes it possible to keep the impressions for a long time thanks to its dimensional stability, which in practice allows monitoring and comparing the measured materials during its whole lifetime. Thanks to its hardness that is lower than the hardness of the material of the measuring elements, the measuring elements do not suffer any wear even if the measurement is repeated many times. The fixtures in the center of the measuring blades makes it possible to reduce the force necessary to create an impression in the impression surface, while all of the requirements on measurement accuracy are kept. This solution also makes it possible to choose other materials for the measuring elements, which do not have to have such high-performance mechanical properties, as well as materials for the impression surfaces, which can be made of a stronger material. The resin-based adhesive ensures a durable connection even under extreme conditions, such as big temperature differences, external influences and the like. The necks at the bottom of the measuring elements facilitate the in-leak of the adhesive and increase the strength and accuracy of the joint between the measuring element and the transport preparation. The tapered ends of the measuring elements ensure a joint between the measuring element and the measured material that is strong, accurate and durable.

Since the measuring elements are kept in a transport preparation following their precision setting, it is possible to transport and place these measuring elements basically in any place while keeping the accuracy settings; after their placement on the measured material the measuring elements can be easily disconnected from the transport preparation. The rigidity of the transport preparation can be increased by creating crimps or by connecting reinforcing elements. The transport preparation can comprise a plotting board, the ends of which are bent upward for the purposes of easier withdrawal of the transport preparation from the measured material when the measuring elements are attached to the measured material.

The specified solution allows for the repeatable production of the meter subject to keeping the required parameters, such as the average deviation of the blade distance or the apparent measurement error.

If needed, it is possible to use a bail-shaped transport preparation, fitted with surfaces for the measuring elements at its ends. This solution makes it possible to keep the measuring elements at a rather high mutual distance, for instance on turbine blades or compressor blades. In order to read the impressions it would be necessary to use a similar bail with an impression surface at its ends.

The measuring elements can be placed on the measured material to form the shape of a rosette, thus creating the possibility to monitor the linear strain in many different directions simultaneously. To facilitate the alignment of the reading device with the measuring elements, for example if they are installed on a measured material that is underground, on a high-temperature device or a device hazardous to health, at heights and the like, it is possible to install an adaptor in the shape of pyramid, taper and the like at the measuring elements.

To facilitate the reading at greater distances, it is possible to attach a device for the remote transmission of the measured data to the reading device; this remote transmission device would make it possible to transmit the measured data without any distortions using mathematical methods.

The measurement set as described in this solution gives the possibility of accurate measurement of permanent strain of materials in their short measured sections using very accurate measuring devices, such as measuring microscopes. Since this large and heavy device cannot be used directly in the terrain, i.e. on bridges, oil pipelines, vessels and other structures where the condition of the structure has to be monitored following any excessive stress, e.g. earthquake, it is beneficial to use the set under this solution, where the spacing of the measuring elements is measured with a measuring microscope before and after the stress on the impressions of the measuring points, created on the withdrawn impression body.

BRIEF DESCRIPTION OF DRAWINGS

The invention will be described in greater detail on a specific design example using the attached drawing, where.

DETAILED DESCRIPTION OF THE INVENTION

Figure 1:
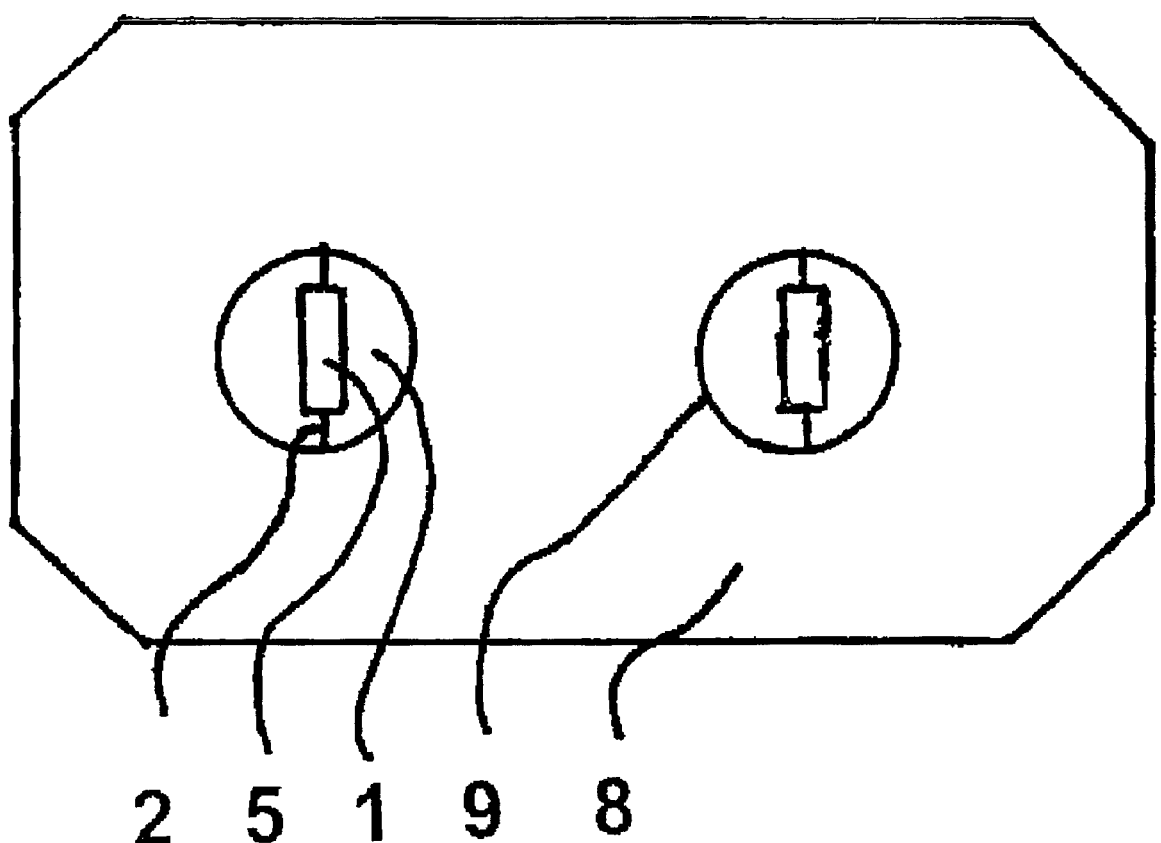
FIG. 1 shows a ground view of the arrangement of two measuring elements and FIG. 2 shows a side view of the arrangement of the measuring points in the transport preparation.
Figure 2:
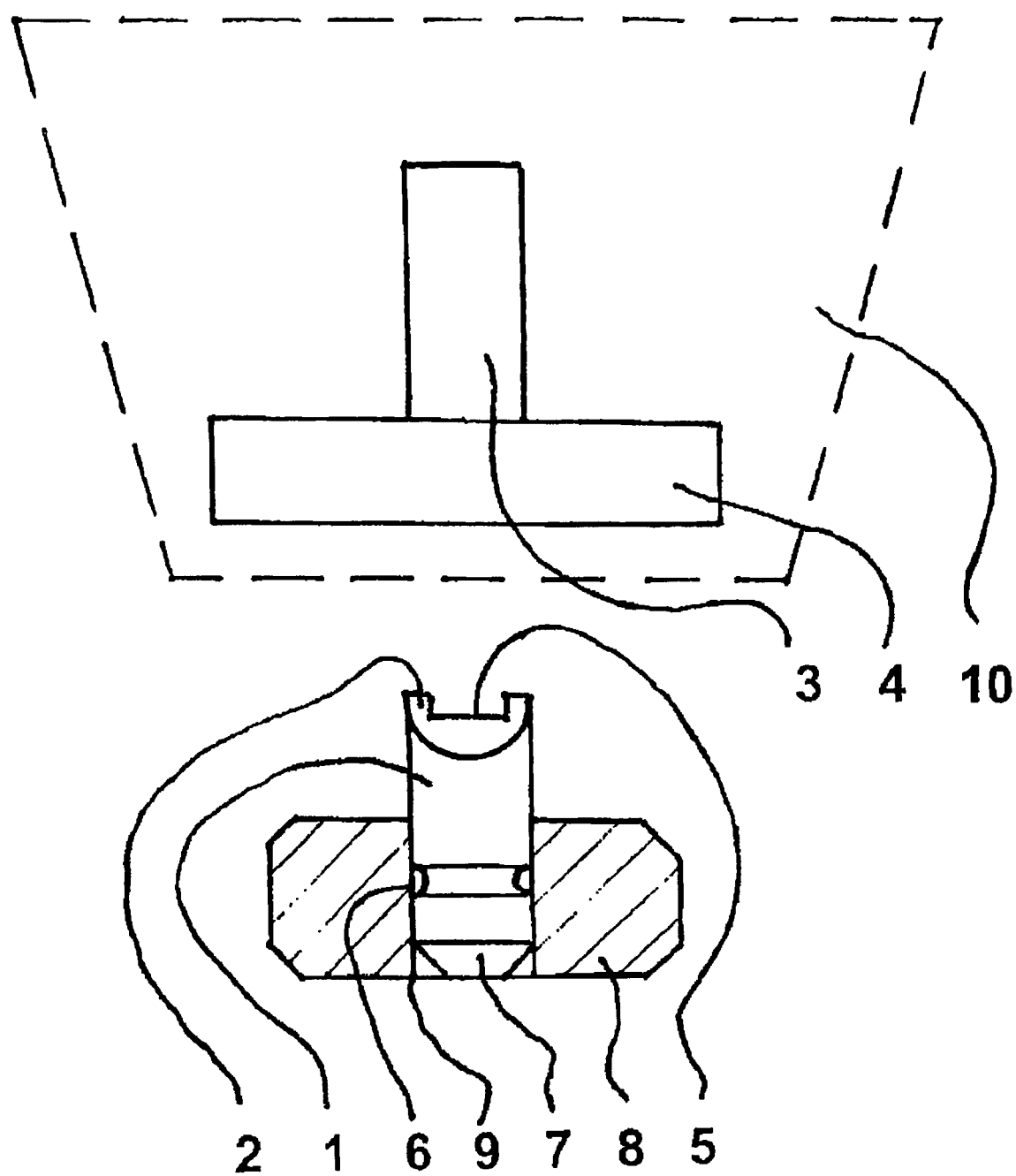

The exemplary set for measuring the linear strain of materials comprises two measuring elements 1, which are attached to the measured material, and a portable reading device 3 with an impression surface 4. The measuring elements 1 are fitted with measuring blades 2, which are fitted with fixtures 5 in the center; the measuring elements 1 are fixed to the surface of the measured material with the parallel axes of the measuring blades 2. The impression surface 4 of the reading device 3 is made from a material with dimensional stability and hardness lower than the hardness of the material of the measuring elements 1, such as soft metals, e.g. various alloys of lead or various waxes, including dental wax and the like. The measuring elements 1 are attached to the surface of the measured material using a resin-based adhesive. The adhesives used are resistant to high temperatures and have a long durability.

Following the precision setting of parallelism, the measuring elements 1 are kept in a transport preparation 8 comprising a plotting board with holes 9, for the measuring elements 1. The joint between the measuring elements 1 and the transport preparation 8 has a lower strength than the joint between the measuring elements 1 and the measured material. The bottom section of the measuring elements 1, located in the transport preparation 8, is fitted with necks 6 for easier in-leak of the adhesive and increased strength and accuracy of this joint. The rigidity of the transport preparation 8 can be increased by creating crimps or by connecting reinforcing elements. The transport preparation 8 can comprise a plotting board, the ends of which are bent upward for the purposes of easier withdrawal of the transport preparation 8 from the measured material when the measuring elements 1 are attached to the measured material. The tapered ends 7 of the measuring elements 1 allow a strong, resistant and permanent connection between the measuring element 1 and the measured material.

If needed, it is possible to use the bail-shaped transport preparation 8 fitted with surfaces for the measuring elements at its ends 1. This solution makes it possible to keep the measuring elements 1 at a rather high mutual distance, for instance on turbine blades or compressor blades. In order to read the impressions of the measuring elements 1 it would be necessary to use a similar bail with the impression surface 4 at its ends.

The measuring elements 1 can be placed on the measured material in a rosette-shaped form, which makes it possible to monitor the linear strain of the measured material in different directions at the same time. To facilitate the reading at greater distances, it is possible to attach a device for the remote transmission of the measured data to the reading-device 3; this remote transmission device would make it possible to transmit the measured data without any distortions using mathematical methods.

During the production of this set for measuring the remote linear strain of materials, the transport preparation 8 is attached to the three-axis table of the machine and the measuring elements 1 are placed in the holes 9 in the transport preparation 8; their mutual distance and the accurate parallelism of the axes of the blades 2 are set using precision measuring devices. After that the measuring elements 1 are fixed in that position using the adhesive, which has a lower strength than the adhesive used between the measuring elements 1 and the measured material.

During the measurement of remote strain of materials using this set, impressions of the measuring elements 1, fixed to the surface of the measured material, are created on the impression surface 4 and the accurate distance of the identified points of both impressions is measured in a place distant from the measuring elements 1. Taking into account the shape of the measuring elements 1, it is possible to manufacture the measuring elements 1 even from materials with lower mechanical properties. The first pair of impressions is created at the beginning of the measurement, for example prior to the strain; another pair of impressions of the measuring elements 1 is created after a certain period, of time or after a critical stress on the material. The distances of the first pair and the second pair of impressions are then compared. The set therefore comprises a fixed part, consisting of the measuring elements 1 fixed to the measured section of the material, a portable part, consisting of the reading device 3 with the impression surface 4, for creating the impressions of the measuring elements 1; a generally available device for measuring the longitudinal dimensions with the required measurement accuracy is also necessary.

The set for measuring the linear strain under this invention can be used in places with complicated access and subject to extreme requirements on the change of the ambient environment, such as in airplanes. In this case toe measuring elements, among others, have to be small and light and their attachment to the measured material has to be very strong; the joint has to withstand, high temperature changes. The benefit of the application of this set is the possibility of permanent installation of the measuring elements, the possibility of regular checks of dimensions of the measured material, even in commonly inaccessible places, without the need to dismount parts of the airplane. For the easier alignment of the reading device 3, an adapter 10 for the alignment of the reading device 3 with the measuring elements 1 can be installed at the measuring elements 1 nearby the measured material.

The measuring set can be also used for the measurement of turbine blades and compressor blades. Because of the small dimensions and weight, the measuring elements can be attached directly to the blades, so it is possible to identify dimensional changes of individual blades or opposite blades at any time.

INDUSTRIAL APPLICABILITY

The set for measuring the linear strain of materials under this invention can be applied in many industrial fields, especially in aircraft, vessels, power management, building and the like.

The invention claimed is:

1. A set for measuring the linear strain of materials, comprising:
    at least two measuring elements, which are fitted with measuring blades having respective parallel axes, and which are attachable to the measured material for measuring a linear strain of the measured material; and
    a portable reading device having an impression surface made of a material with dimensional stability and strength lower than the strength of at least one the material of the measuring elements and the portable measuring device, wherein:
    the measuring blades are fitted with fixtures in a central region, and the measuring elements are fitted with necks and a tapered end at a bottom portion thereof; and
    the measuring elements are attached to the surface of the measured material using a resin-based adhesive.

2. A measuring set according to claim 1, wherein:
    the measuring elements are kept in a transport preparation, which comprises a plotting board with holes for accommodating the measuring elements, following the precision setting of parallelism of the axes of the measuring blades; and
    the joint between the measuring elements and the transport preparation has a lower strength than the joint between the measuring elements and the measured material.

3. A measuring set according to claim 1, wherein the measuring elements are placed in the shape of a rosette on the measured material.

4. A measuring set according to claim 1, wherein the measuring elements are provided with an adapter for the alignment of the reading device with the measuring elements at the measured material.

5. A measuring set according to claim 1, wherein the transport preparation comprises a plotting board whose ends are bent upward.

6. A measuring set according to claim 1, wherein the transport preparation is in the shape of a bail, and is fitted with surfaces for the ends of the measuring elements, and a portable reading device comprising a similar bail with an impression surface is placed at the ends of the similar bail.

7. A measuring set according to claim 1, further comprising a device for the remote transmission of the measured data to the reading device.

8. A measuring set according to claim 1, wherein the measuring blades are configured to measure a linear stress of the measured material based on an impression of the location of the measuring blades impressed into the impression surface of the portable reading device.

* * * * *